Aug. 5, 1969   F. W. CHRISTENSEN   3,458,921
SHORT PULSE VIBRATORY BONDING
Filed July 19, 1965   8 Sheets-Sheet 1
PRIOR ART
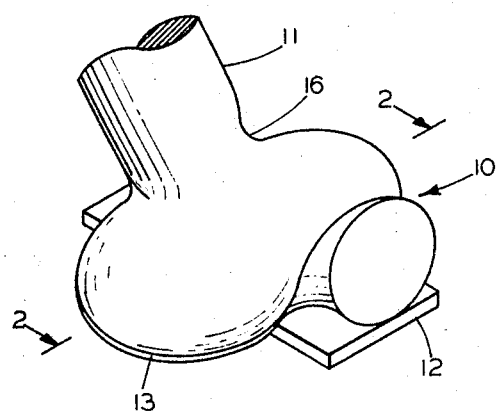
FIG. I
PRIOR ART
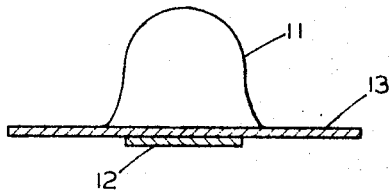
FIG. 2
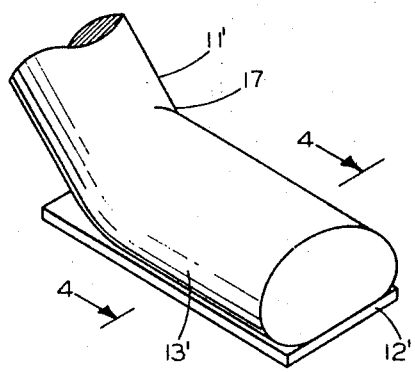
FIG. 3
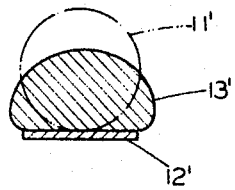
FIG. 4
INVENTOR
F.W. CHRISTENSEN
By D. S. Urey
ATTORNEY

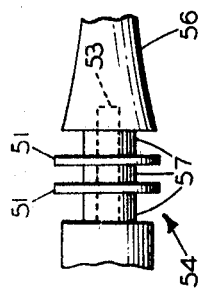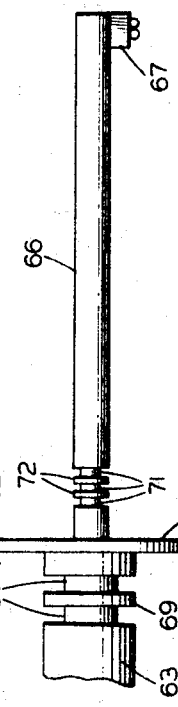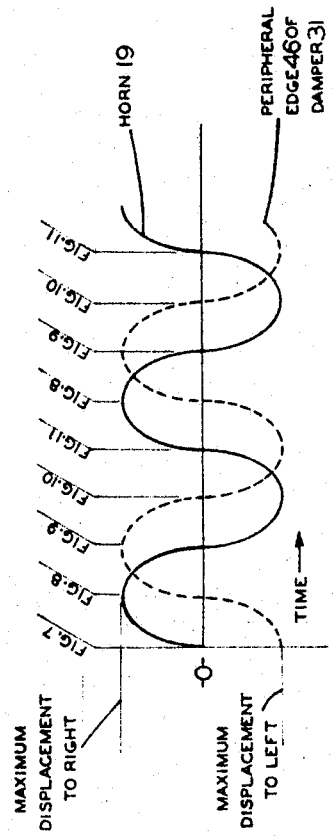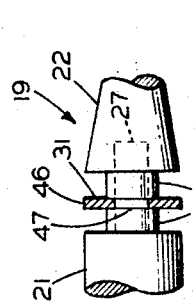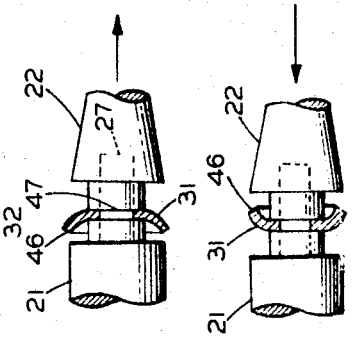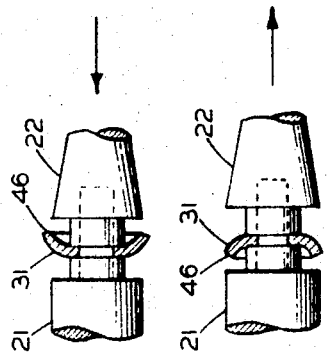

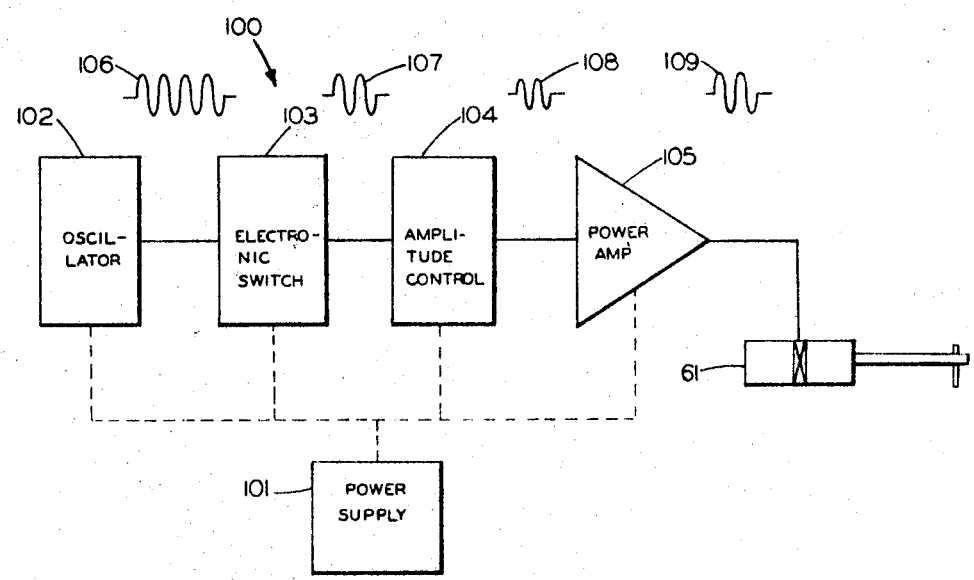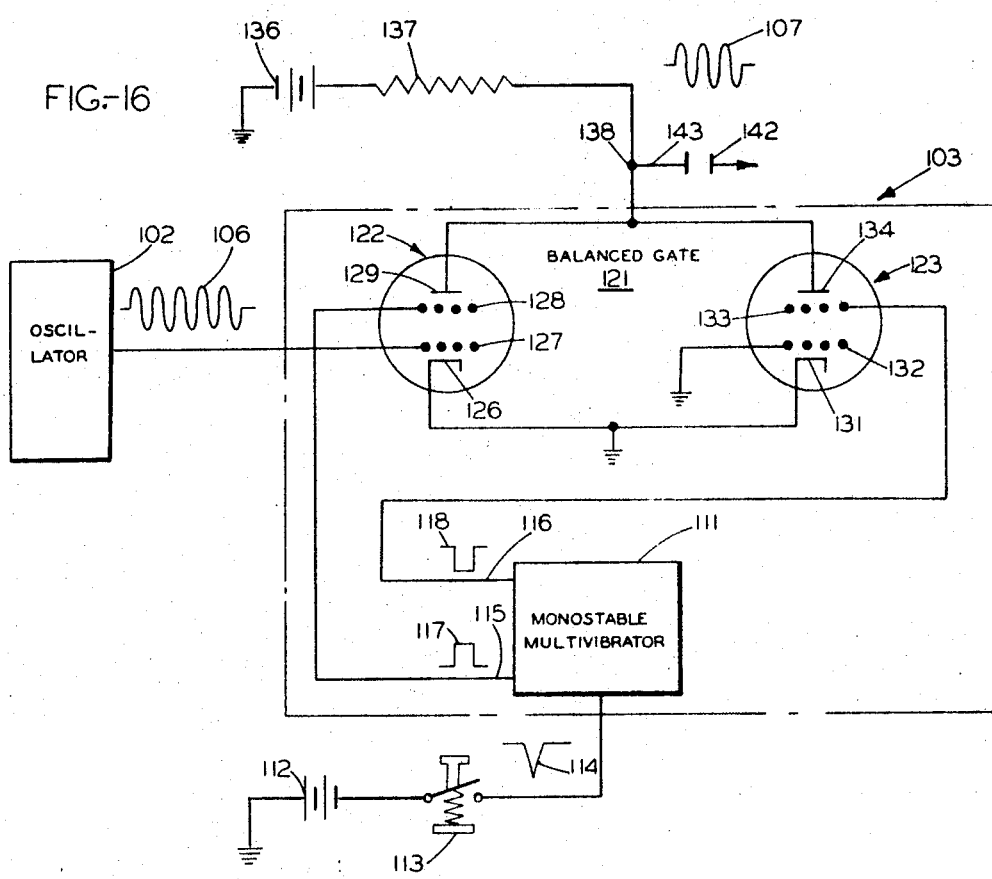

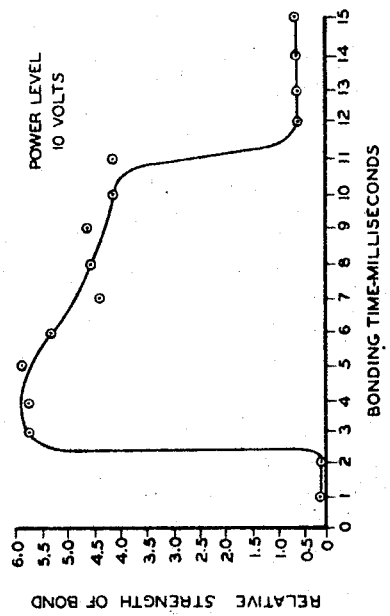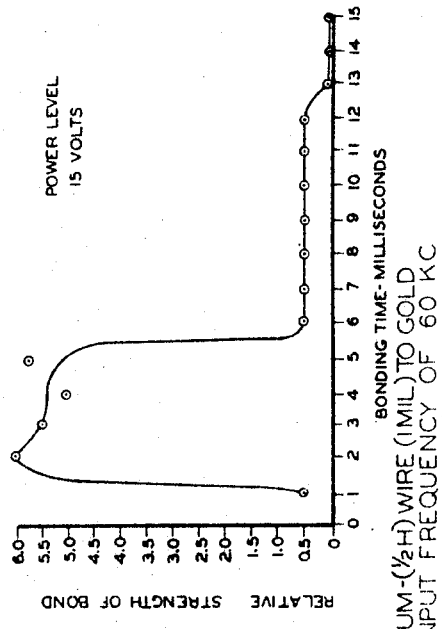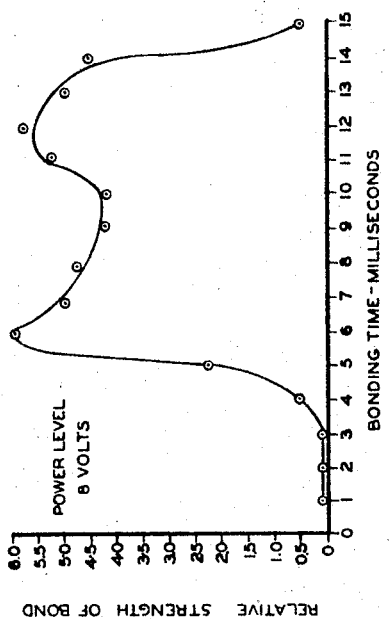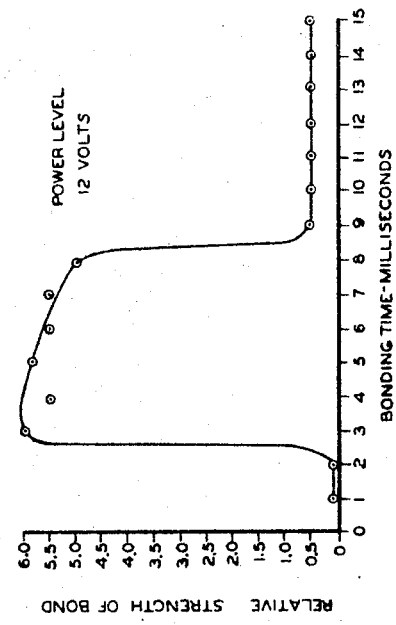

1 MIL GOLD WIRE BONDED TO GOLD PLATED "KOVAR" SURFACE
BOND TIME OF 650 MICROSECONDS AT 60KC

1 MIL GOLD WIRE BONDED TO GOLD PLATED "KOVAR" TERMINAL
BOND TIME OF 650 MICROSECONDS AT 60 KC

# United States Patent Office 3,458,921
Patented Aug. 5, 1969

3,458,921
SHORT PULSE VIBRATORY BONDING
Frank W. Christensen, Pennington, N.J., assignor to
Western Electric Company, Incorporated, New
York, N.Y., a corporation of New York
Filed July 19, 1965, Ser. No. 472,999
Int. Cl. B23k 31/02
U.S. Cl. 29—470.1
22 Claims

ABSTRACT OF THE DISCLOSURE

An optimum ultrasonic bond is formed by accurately controlling the amount of ultrasonic energy applied to the bond. It has been found that if too much ultrasonic energy is applied degradation of the bond occurs and if too little ultrasonic energy is applied no bond occurs. Damping facilities are employed to stop continuing vibration or ringing down of an ultrasonic bonding apparatus to facilitate accurate control of the bonding interval.

The present invention relates to methods of and apparatus for employing vibratory energy to bond minute elements, and more particularly to methods of an apparatus for joining minute elements by applying very short pulses of vibratory energy.

In the past, it has been customary when bonding elements with vibratory energy to apply a pulse of energy for a relatively long period of time, as for example, several hundredths of a second to several seconds as disclosed in Jones et al. Patent 2,946,119 and Jones et al. Patent 2,985,954. Such pulse times are satisfactory when joining relatively large sized wires and other shapes of metals. However, it has been found that methods and apparatus employing such pulse times are not satisfactory when bonding minute elements, such as ½ to 2 mil diameter wire to transistor stripes and terminals. In attempting to bond such elements, it has been found that the bond reliability is less than that attained by alternative bonding methods and that the wires are severely deformed or "mashed out" over the surface of the stripes causing reduced load strength. The problem of mash-out has been alleviated to some extent by modifications to the configuration of the bonding tip which is employed.

It has been found that such reliability and deformation problems are caused by the use of excessively long bonding periods (excessive mechanical-acoustical vibrations) during which the vibratory energy is applied to the elements to be bonded, i.e., the pulse time. The problem is further aggravated by the fact that even after the cessation the application of energy, the bonding apparatus continues to vibrate, commonly called "ringing down," with decreasing amplitude for a period, usually called the decay time. The decay time is independent of the pulse time and is relatively insignificant when dealing in pulse times of a second, or so. However, when bonding with pulse times in the millisecond and microsecond range, the decay time can become quite a significant portion of the total pulse time. As the decay time is an exponential decay period, its duration depends on the magnitude of its starting height, i.e., the initial amplitude of the decaying vibration.

It has further been found that when bonding very small elements with conventional pulse times of one half to several seconds, a bond is produced during the early portion of the pulse time, after which the bond is broken, remade, broken, etc. The elements are worked excessively and are deformed during the later portion of the pulse time with no increase of bond strength or reliability. In accordance with the invention, apparatus is provided for greatly reducing the decay time of the bonding system. Also, vibratory energy is applied for a minimum permissible pulse time to effect a bond having a predetermined strength, the amount of deformation is greatly reduced and bond reliability is improved.

In conventional vibratory bonding apparatus, it is not unusual to find decay times in the range of five to six milliseconds although one to two milliseconds is more common. These figures may be derived by measuring the length of the decay curve which appears on an oscilloscope between the 90% and 10% points of the peak amplitude of the curve. By employing mechanical brakes or dampeners in accordance with the principles of this invention, it has been possible to bring the bonding apparatus to rest in approximately 200 microseconds as measured between the same 90% and 10% points of the curve. Likewise, by employing electrical dampeners it has been possible to bring the apparatus to rest in a period as short as several microseconds.

The importance of stopping the continuing vibration of the apparatus as rapidly as possible is further emphasized by the fact that it takes more energy to make a bond than to break the same bond. In order to break a bond, it is necessary to provide enough energy to exceed the shear strength limits of the bond. However, in order to remake the bond, it is believed necessary to not only provide enough energy to exceed the shear strength limits, but also to provide an additional finite amount of energy to form a fusion interface between the to-be-bonded members. Thus, if after the bond has been formed and the short driving pulse has ceased, the exponentially decaying vibrations supply enough energy to break some of the individual molecular bonds, it is quite possible that the decaying vibrations will not supply sufficient energy to remake all those molecular bonds which were broken. However, if the apparatus is stopped shortly after the minimum pulse time and then is rapidly brought to a rest position, more of the molecular bonds will remain intact.

At first glance, it may seem that rapid dampening would reduce the possibility of securing each individual molecular bond. This would seem so because, if the decaying vibration broke a molecular bond, the energy available on the next cycle of vibration to remake the bond would be less than that in an undampened apparatus. However, it is believed that the energy available to make a bond is not dissipated within one driving cycle, but rather that it is present for several cycles. Therefore, if the apparatus is rapidly brought to a rest position after the minimum pulse time, the energy present in each individual molecular bond will be at a level high enough to maintain that bond.

It is an object of the present invention to provide new and improved methods and apparatus for bonding small elements by applying short pulses of vibratory energy.

It is another object of the present invention to provide new and improved methods and apparatus for bonding a minute wire to an element so that the wire has a desired optimum amount of deformation.

It is still a further object of the present invention to provide methods and apparatus for forming a strong bond between minute elements by applying a very short pulse of energy having an optimum pulse time.

It is another object of the invention to provide methods and apparatus for bonding minute elements by applying the minimum number of mechanical-acoustical vibrations to the elements and then rapidly bringing the elements to a rest position.

It is still another object of the invention to provide methods for bonding minute elements with vibratory energy wherein the pulse time is slightly above the minimum necessary to effect a true acoustical and metallurgical bond and the clamping force and tip excursion are held within a narrow range to attain optimum bond characteristics.

With these and other objects in mind, an apparatus in accordance with the invention includes a vibratory bonding apparatus designed to resonate at a predetermined range of frequencies of operation for joining minute elements. The apparatus includes facilities for converting a short pulse electrical signal into mechanical vibrations and transmitting those vibrations to the minute elements to be joined. A device, such as a resonant dampener, is associated with the bonding apparatus for absorbing the vibrational energy of the bonding apparatus to oppose and stop the continuing vibration or ringing down of the bonding apparatus at the end of the short pulse electrical signal and thereby decrease the decay time.

In another embodiment a plurality of resonant dampeners are mounted on the bonding apparatus for opposing vibrations of various frequencies to stop the ringing down of the bonding apparatus.

Another embodiment of the invention relates to methods of bonding minute elements by holding the elements in contact and applying a short pulse of vibratory energy. The ringing down of the vibrator is opposed to rapidly bring the vibrator to a rest position. Another method relates to determining an optimum range of pulse times by varying in increments the pulse times to bond a plurality of like pairs of members. The bonds are tested for strength and compared in order to determine a range in which optimum bonds are achieved.

In another method optimum bonds are effected by holding the to-be-bonded faces together with a force in a particular range. A short pulse vibratory energy is applied for a predetermined period of time to move the to-be-bonded faces relative to each other a predetermined distance.

Other objects, advantages and aspects of the invention will become apparent by reference to the following detailed description of a specific embodiment thereof, when taken in conjunction with the acompanying drawings, in which:

FIG. 1 is a perspective view of a bonded stripe and lead wire having excessive mash-out;

FIG. 2 is a sectional view taken on line 2—2 of FIG. 1 showing the deformed lead wire;

FIG. 3 is a perspective view of a stripe and lead wire bonded by apparatus and methods embodying the principles of the present invention;

FIG. 4 is a sectional view taken on line 4—4 of FIG. 3 showing a bonded lead wire in solid lines having a desirable amount of deformation, and showing in phantom outline the original lead wire;

FIGS. 7–11 are partially cut-away side elevation views of a bonding apparatus showing the out-of-phase relationship of a resonant dampener and the bonding apparatus as the apparatus is moved through one cycle of operation;

FIG. 12 is a graph showing the out-of-phase relationships depicted in FIGS. 7–11 plotted against time;

FIG. 13 is a partially cut-away side elevation view of a second embodiment of the invention showing a bonding apparatus having a pair of resonant dampeners;

FIG. 14 is a partially cut-away side elevation view of a third embodiment of the invention showing a stepped horn bonding apparatus having several resonant dampeners thereon;

FIG. 15 is a block diagram of a power supply for supplying a short pulse bonding signal to the transducer of a bonding apparatus;

FIG. 16 is a schematic diagrammatic view of the electronic switch shown in FIG. 15, and showing a balanced gate;

FIGS. 17–20 are graphs indicating the relationship of the strength of bonds of one mil silicon-aluminum wire to a gold-plated surface as bonding time and power are varied;

CONFIGURATION AND DEFORMATION OF BONDED PARTS

Figure 5:
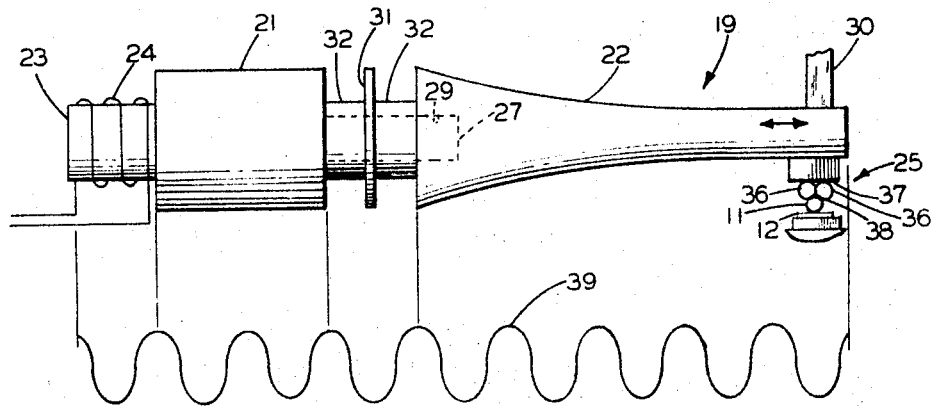
FIG. 5 is a side elevation view of an apparatus embodying principles of the present invention, including a vibratory bonding apparatus having a resonant dampener, and showing the nodal and antinodal planes of the bonding apparatus.

In FIGS. 1 and 2, there is shown a pair of bonded articles 10 which comprise a wire 11 bonded to a transistor stripe 12. An enlarged area 13 of the wire 11 has been deformed or mashed out by the forces applied during vibratory bonding. As may be seen in FIG. 2, after bonding, the cross-section of the wire 11 has been extensively flattened out. By definition, if the initial wire 11 had a width of 1 mil and the resulting wire after bonding had a width of 3 mils in the vicinity of the bond due to mechanical deformation, 200% mash-out has occurred. Generally in the past, when employing vibratory bonding techniques to minute wires, a mash-out of approximately 400% has occurred, although this has been reduced to approximately 100% by improvement in the tip design.

When bonding a round wire to a flat surface, it can readily be seen that if no deformation whatsoever takes place, the bonding area between the wire and the flat surface is practically negligible, peel strength is minimal, and a weak bond results. On the other hand, where there has been extensive mash-out, as shown in FIG. 2, the cross-sectional area of the wire is reduced which reduces the tensile strength of the wire.

In order to achieve the optimum bond strength, it is desirable that there be a certain amount of deformation to provide a high peel strength, but not so much deformation as to reduce appreciably the tensile strength of the wire. It can easily be seen that where the peel strength is equal to the tensile strength, optimum bond strength is achieved. When bonding 2 mil diameter gold and aluminum wires to 2 mil stripes, it has been found that 10% to 20% mash-out provides a bond wherein the peel strength is approximately equal to the tensile strength.

It is to be understood that whether using well-known bonding techniques, such as that disclosed in J. B. Jones et al., Fundamentals of Ultrasonic Welding, Phase 1, of the Office of Technical Services, PB 161677 (May 1959), or the short pulse techniques disclosed herein, a certain minimum amount of pressure or clamping force must be applied to the parts to be bonded. If excessive force is utilized, extreme mash-out will occur regardless of pulse time. It has been found that simply reducing the clamping force will not alleviate the problem of mash-out. However, the combination of short pulse bonding techniques with clamping forces held within certain ranges has been successful in achieving true metallurgical and acoustical bonds. By definition, in a metallurgical bond an intermetallic compound is formed in which molecules of one member become united with molecules of the other member. An acoustical bond is one in which the energy to form the bond is acoustical or vibratory in nature rather than heat, pressure, etc.

In FIGS. 3 and 4, there is shown a wire 11' bonded to a transistor stripe 12'. An enlarged area 13' of the wire 11' has been deformed by the forces applied in vibratory bonding. It can be seen that while the wire 11' has a cross-section of one diameter, the mashed-out area 13' has a cross-section of approximately 1.2 diameters, or 20% mash-out. It should be noted that the stresses in the wire 11 at 16 (FIG. 1) are greater than these in the wire 11' at 17 (FIG. 3).

VIBRATORY BONDING APPARATUS

In FIG. 5, a bonding apparatus for effectuating the bonds of FIGS. 3 and 4 is illustrated. The apparatus comprises a coupling member or sonotrode 19 which includes a velocity transformer 21 and a tapered portion or horn 22. Mounted on one end of the horn 22 of the sonotrode 19 is a bonding tip 25. The velocity transformer 21 is provided with a stub shaft 27 which is received in a slot 29 in the other end of the horn 22. The entire sonotrode 19 including the bonding tip 25 is vibrated or driven by a magnetostrictive transducer 23 having an excitation coil 24. As is known, the frequency of the expansion and contraction of such a transducer 23 will be approximately equal to the frequency of an alternating current flowing in the excitation coil 24. In FIG. 5 the vibrations of the bonding apparatus are shown in a direction perpendicular to the longitudinal axis of the wire 11. It is to be understood that the principles of the instant invention also are applicable if the vibrations are in the same direction as the longitudinal axis of the wire 11.

A force applying member 30 is provided to vary the pressure between the bonding tip 25 and the wire 11 and the stripe 12. Also mounted on the stub shaft 27 is a disc shaped resonant dampener 31 which vibrates in dissonance with the sonotrode 19. Mounted on the sides of the dampener 31 are spacers 32—32 which constrain the dampener 31.

The bonding tip 25 may be formed by a pair of cylindrical members 36—36 secured in parallel relationship to an end 37 of the tip 25 in the manner disclosed in patent 3,128,649, issued on April 14, 1964 in the name of A. J. Avila et al. entitled, "Bonding Device for Joining a Wire-Like Member to a Part." A groove 38 having arcuate, converging sides is formed by the pair of cylindrical members 36—36 for receiving a wire 11. Any of a number of other tip designs may be employed, as this particular tip configuration forms no part of the instant invention.

The transducer 23 may be of a magnetostrictive type comprising a laminated core of nickel, nickel-iron alloy, or iron-cobalt alloy, or other magnetostrictive material, such as a ferrite, properly dimensioned to insure longitudinal resonance with the frequency of the alternating current applied thereto so as to cause it to decrease or increase in length according to its coefficient of magnetostriction. The transducer may also be of piezoelectric material, such as quartz crystals, or an electrostrictive material, such as barium titanate, or may consist of ferroelectric materials.

The velocity transformer 21 is generally cylindrical in shape and can be made of any high efficiency acoustical material, such as titanium, aluminum or stainless steel.

The horn 22 is shown as having tapered profile which may be an exponential function of the length. A wide range of horn shapes may be used, such as a cone, a stepped horn, or the horn may be defined by various orders of curves. As in the case of the velocity transformer 21, the horn 22 should be of a high efficiency acoustical transmitting material.

The resonant dampener 31 has as its primary function the absorption of energy from the vibratory apparatus so as to minimize the decay time. Basically, the dampener 31 is an energy absorber which operates out of phase with the remainder of the vibratory apparatus. It is preferably made of lead, brass, plastic or other material which is capable of absorbing a large amount of energy through flexure, and dissipating the energy in the form of heat.

Figure 6:
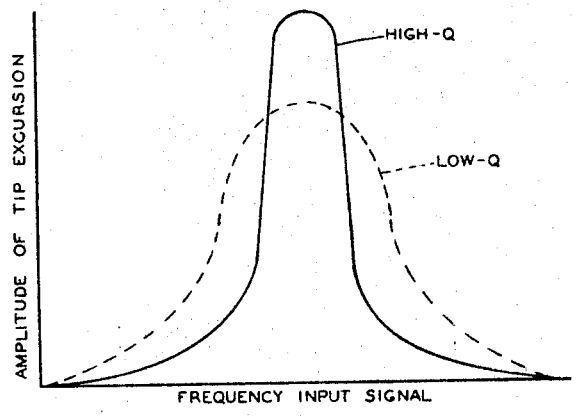
FIG. 6 is a graph showing the relationship between the frequency of the input signal and the amplitude of the tip excursion of a high efficiency bonding apparatus in solid lines, and a lower efficiency bonding apparatus in broken lines.

The velocity transformer 21, horn 22, tip 25, resonant dampener 31 and the spacers 32—32 comprise a vibratory bonding apparatus which has a particular natural resonant frequency or, more accurately, a narrow band of resonant frequencies (FIG. 6). At the resonant frequency, the excursion or displacement of the bonding tip 25 is a maximum and thus the efficiency of the appartus is a maximum. In this context, efficiency relates to the amplitude of the excursion of the tip 25 as a function of the amplitude of the alternating signal which is applied to the excitation coil 24. The addition of the dampener 31 and spacers 32—32 adds bandwidth to the apparatus and thus acts to broaden the range of resonant frequencies of the apparatus.

Another effect of the resonant dampener 31 is that the efficiency of the vibratory system is reduced because the dampener 31 is not in phase with the movement of the remainder of the apparatus. This relationship can be graphically seen by referring to the dashed line curve of FIG. 6. The solid line represents the resonant characteristics of the bonding apparatus without the dampener 31, and the broken line represents the resonant characteristics with the dampener 31 and spacers 32—32 present. Thus it can be seen that, while the efficiency is somewhat reduced, the frequency at which the apparatus may be driven for maximum excursion is now less critical and extends over a broader range of frequencies.

In designing a bonding apparatus, it is usually desirable to maximize the efficiency of the system by the use of various high efficiency acoustical materials and by selecting a horn shape which facilitates the production of standing or stationary waves. Such a design also results in a long decay time or ringing down after the cessation of the application of energy, and during which time the bond may be broken, remade, broken, and so on. It is the purpose of the dampener 31 to reduce the decay time at the sacrifice of a certain amount of efficiency of the apparatus. It should be apparent that the power necessary to bond minute elements, such as 1 mil wires to small transistor stripes, is not great. However, it is very important that a strong, reliable bond be effected. Therefore, the consumption of electrical power is a minor consideration in comparison to the strength of the resulting bond.

In FIG. 5, a typical longitudinal standing wave 39 which exists in a vibrating bonding apparatus is shown. It should be noted that the length of the transducer 23 is preferable an integral number of half-wave lengths at the operating frequency, as is the velocity transformer 21 and the horn 22. Also, the antinodal planes of the standing wave 39, or the planes of maximum disturbance, coincide with the ends of the transducer 23, the ends of the velocity transformer 21, the center of the dampener 31, the left-hand edge of the horn 22 and the center of the bonding tip 25.

It is particularly desirable that the dampener 31 be positioned on an antinodal plane, i.e., a plane of maximum disturbance of the standing wave, if it is to absorb the maximum amount of energy at the end of the pulse time. Thus ideally all of the mass of the dampener 31 should be positioned along an antinodal plane. If this were possible, the center of the bonding tip and the other various points on the bonding system which are shown at antinodal planes could be precisely located at such planes. In practice, the dampener 31 has a finite thickness and cannot be completely coincidental with an antinodal plane. Furthermore, it is desirable that the tip be displaced from an antinode so as to provide an impedance match between the horn 22 and the tip 25.

It is to be understood that in addition to the standing longitudinal waves 39 present in a vibrating bonding apparatus, there are radially propagating shear waves in the dampener 31 which are perpendicular to the longitudinal waves 39. Generally, the speed of the shear waves is less than the longitudinal waves 39, although this depends on such things as the materials used and the radius of the dampener. It has been discovered that if the "free radius" of the dampener 31 is one quarter of a wave length of the shear waves, the movement of the periphery of the dampener will be one quarter of a cycle out of phase with the longitudinal movement of the bonding system. The free radius refers to that portion of the dampener 31 which extends radially beyond the spacers 32–32. Under these conditions, the dampener 31 has maximum effectiveness for decreasing the decay time. It should be understood that although the velocity and wave length of the longitudinal waves and the shear waves are different under normal conditions, the frequencies of the two wave forms are equal since both are initiated by the same vibratory forces. For example, if the input signal has a frequency of 60 kc., one quarter of a cycle occurs in 4⅛ microseconds. Therefore, the movement of the peripheral edge of the dampener 31 would lag the bonding apparatus by 4⅛ microseconds.

Referring to FIGS. 7–11, the dampener 31 is mounted on the sonotrode 19 and has a peripheral edge 46 and a central portion 47 which is gripped between the spacers 32–32. The sonotrode 19 is shown in its various positions as the bonding apparatus moves through one cycle of periodic vibration or displacement, which is simple harmonic motion. In FIG. 12 the relative displacements of the sonotrode 19 and of the peripheral edge 46 of the dampener 31 are plotted against time.

In FIG. 7, the apparatus is at rest, and the dampener 31 is vertical. In FIG. 8, the bonding apparatus has moved through one quarter of a cycle to the extreme right-hand position where it is instantaneously at rest and about to commence movement to the left. At this point the peripheral edge 46 of the dampener 31 has had no motion; whereas the central portion 47 of the dampener 31 has been displaced an amount equal to the displacement of the stub shaft 27. The dampener 31 has flexed, thereby absorbing energy which is dissipated in the form of heat. As the apparatus commences movement to the left, the peripheral edge 46 is moving to the right in a direction opposite and opposed to the apparatus. (See FIG. 12 for the relative displacements of the elements once the apparatus has begun operation.)

In FIG. 9, the dampener 31 is shown as it passes through the one half cycle position. The edge 46 is still one quarter of a cycle out of phase, and has moved to the extreme right-hand position.

In FIG. 10, the bonding apparatus has moved through three quarters of a cycle to the extreme left-hand position where it is instantaneously at rest and about to commence movement to the right. At this point the edge 46 still lags by one quarter of a cycle. The dampener 31 is flexed thereby continuously absorbing energy from the apparatus. It should be noted that while the apparatus is about to commence movement to the right, the dampener 31 is about to flex to the left.

In FIG. 11, the apparatus has completed one complete cycle, and is moving to the right; whereas the dampener 31 has flexed to the left in opposition to the apparatus. At all the various states of the cycle, it should be noted that the edge 46 is one quarter of a cycle out of phase with the movement of the rest of the apparatus. This is so because the free radius of the dampener 31 is one quarter of a wave length of the shear waves in the dampener, and because the frequencies of the longitudinal waves and the shear waves are equal.

It can be seen that on completion of a driving cycle, the dampener 31 is in a position which is out of phase with the movement of the sonotrode 19. Thus, as the sonotrode 19 attempts to continue to vibrate in an exponentially decaying manner, the dampener 31 acts in opposition to the movement so as to bring the apparatus to a rest position. This avoids the continued making and breaking of a bond and the resultant excessive mechanical working of minute members which have already formed an acceptable bond.

The design of the dampener 31 has been described in its preferred embodiment wherein the free radius is one quarter of a wave length of the shear waves, and it is mounted at an antinodal plane of the sonotrode 19. It is to be understood that numerous other dimensions, designs and mounting positions of dampeners are possible for rapidly reducing the decay time. For example, in FIG. 13, a pair of spaced dampeners 51—51 is mounted on a stub a shaft 53 extending from a sonotrode 54. The shaft 53 is secured to a tapered horn 56, and the dampeners 51—51 are separated by spacers 57—57. In such a system the dampeners 51—51 should have a free radius beyond the spacers 57—57 of one quarter of a shear wave length. The free radius vibrates in the shear mode, with the vibrations propagating in a radial fashion through the volume of the dampeners 51—51. The dampeners 51—51 should have such dimensions as are needed to provide the required bandwidth of the acoustical system; that is, the thickness of the dampeners may vary from zero to one quarter of a shear wave length in order to vary the bandwidth of the over-all system from a minimum to a maximum. Also, the dampeners may be mounted at antinodal planes for maximum effectiveness or they may be displaced slightly from such planes. Other arrangements of dampeners of varying sizes and shapes can be used, by using the same considerations as set forth above.

In FIG. 14, another design is shown wherein a stepped horn bonding tool 61 is employed as the velocity transformer. Stepped horn bonding tools in which two cylindrical members of different diameter are connected end-to-end are known in the art. In the modified design of FIG. 14 a large disc or dampener 62 is mounted at the end of a velocity transformer 63 to form a step. A narrow diameter horn 66 having a bonding tip 67 mounted at one end thereof extends from the velocity transformer 63. The velocity transformer 63 is provided with circular grooves 68—68 which form a protuberance or dampener 69 therebetween. Likewise, the horn 66 is provided with circular grooves 71—71 which form dampeners 72—72 therebetween.

A forward face 73 of the dampener 62 is preferably located at an antinodal plane along the stepped horn bonding tool 61. The dampener 62 is designed to absorb the lower frequency standing waves, while the dampeners 69 and 72—72 are designed to absorb the higher frequency standing waves.

The dampeners 62, 69 and 72—72 may be of the same material as the stepped horn 61, or they may be made of lower efficiency acoustical material so as to reduce further the decay time after the short pulse of driving energy.

CONTROL CIRCUIT

As shown in FIG. 6, in a high-Q electromechanical transducer, the amplitude of the transducer movement, and thus the bonding tip, varies with the frequency of the electrical input signal. Bonding apparatus are usually operated at the resonant frequency to produce a maximum amplitude of tip excursion, as shown by the curve. When such bonding apparatus are used to bond very small parts, the acoustic load on the resonant mechanical system is quite small and is essentially constant. Therefore, the power delivered to the bond varies with the input frequency in a manner similar to the variation of the amplitude shown in the curve of FIG. 6. To insure that the power delivered to the to-be-bonded members remains essentially constant when performing a series of bonding operations, it is desirable that there be good frequency stability.

In FIG. 15, there is shown an open loop, electronic control circuit 100 which operates with good frequency stability and provides energy for bonding pulses which may be as short as 10 microseconds, for example.

The circuit 100 includes a power supply 101 connected to an oscillator 102, an electronic switch 103, an amplitude control 104, and a power amplifier 105. The oscillator 102 generates an oscillatory input signal 106 having a frequency which is compatible with the resonant characteristics of the bonding apparatus. A portion of the signal is selected by the electronic switch 103 to provide a short pulse, oscillatory input signal 107 having a desired pulse time. The amplitude of the short pulse signal 107 is stabilized by the amplitude control 104 to provide a signal 108 which is amplified to a desired power level by the power amplifier 105 to provide a short pulse bonding signal 109. The short pulse bonding signal 109 may be used to drive the stepped horn velocity transformer 61 (FIGS. 14 and 15) or the bonding apparatus shown in FIGS. 5 and 13.

ELECTRONIC SWITCH

In FIG. 16, the electronic switch 103 is shown in detail. It includes a standard monostable multivibrator 111 having a first output terminal 115 and a second output terminal 116. The multivibrator may be of the type shown in Department of the Army Technical Manual, TM 11–690, Basic Theory and Application of Transistors, Ch. 11, Sect. II, para. 191 (1959). A battery 112 is connected to the multivibrator 111 through a foot switch 113 to provide a negative pulse 114 for triggering the multivibrator 111. Normally, before the multivibrator 111 is triggered, the output of the terminal 116 is substantially zero voltage and the output of the terminal 115 is a negative voltage, for example, −20 volts. When the multivibrator 111 is triggered, the zero output of the terminal 116 goes to a negative voltage, for example, −20 volts, and the −20 volt signal of the terminal 115 goes to substantially zero voltage. At the end of the time period of the monostable multivibrator 111, the output of the terminals 115 and 116 return to their initial voltage level resulting in a pair of pulses 117 and 118, respectively.

The electronic switch 103 also includes a transmission gate circuit or a balanced gate 121. The balanced gate 121 includes a first tube 122 which serves as the actual gating tube and a second tube 123 which is connected in parallel with tube 122 for maintaining the D.C. or quiescent output level of the gate 121 at the same level during the non-gating time as during the gating time. The first tube 122 includes a cathode 126, a control grid 127, a suppressor grid 128 and a plate 129. The second tube 123 includes a cathode 131, a control grid 132, a suppressor grid 133 and a plate 134. The cathodes 126 and 131 are connected to a common ground. The oscillatory input signal 106 is supplied to the control grid 127 of the tube 122 by the oscillator 102.

The tubes 122 and 123 are connected in parallel and are supplied with a positive plate supply voltage from a suitable supply in the form of a battery 136 and a series resistor 137. The output of the gate 121 is taken from the upper junction of the plates 129 and 134 at a point 138. A coupling capacitor 142 is connected to the point 138 by an output conductor 143 for coupling the output of the gate 121 to the input of the amplitude control 104 (FIG. 15).

The first output terminal 115 of the multivibrator 111 is connected to the suppressor grid 128 of the first tube 122. The second output terminal 116 is connected to the suppressor grid 133 of the second tube 123. The tube 122 is normally biased for nonconduction by the −20 volt signal from the first terminal 115. When the signal is increased to form the pulse 117 as previously described, the tube 122 is rendered conductive and thereby passes the oscillating signal 106 from the oscillator 102 to the output conductor 143. The tube 123 is normally biased for conduction by the zero voltage signal from the second terminal 116. The tube 123 may be rendered nonconductive by applying the pulse 118 of −20 volts, as previously described.

In operation, when the foot switch 113 is not depressed, the zero voltage signal from the second output terminal 116 is applied to the suppressor grid 133 to maintain the tube 123 conductive. When the tube 123 is conductive, a reference potential or quiescent output level of 25 volts, for example, appears in the output conductor 143 and on the input plate of the coupling capacitor 142 to provide a reference potential between the bonding pulses. This provides an advantage over other types of gates, such as gates employing only one tube or active element, in that there is substantially no change in the D.C. or quiescent output level between the non-gating and gating time. If the shift in the voltage levels is too great, it may adversely affect the operation of the transducer and may be reflected in the fidelity or repeatability of bonds made with the vibratory bonding tool. Thus, the addition of the tube 123 prevents a sudden rise or pedestal in the voltage to the transducer 61 (FIG. 15).

When the foot switch 113 is depressed, the negative pulse 114 triggers the monostable multivibrator 111 so that the pulse 117 increases to a zero voltage which is applied to the suppressor grid 128 to render the tube 122 conductive. At the same time, the pulse 118 is rendered negative and is applied to the suppressor grid 133 to render the tube 123 nonconductive. The oscillating signal 106 from the oscillator 102 is applied to the control grid 127 so that a signal 107 representative of the input signal 106 appears on the output lead 143 for the duration of the time of the pulses 117 and 118.

As is well known in the art, the duration of the pulses 117 and 118 is primarily determined by the time constants of a resistor and a capacitor (not shown) of the multivibrator 111. The time may be varied by providing a variable resistor, and pulse times in the range of $10 \times 10^{-6}$ seconds (10 microseconds) can be achieved. At the end of the pulse time, the potential on the suppressor grid 133 returns to zero to render the tube 123 conductive and the reference potential remains in the output conductor 143. Simultaneously, the potential on the suppressor grid 128 returns to −20 volts to render the tube 122 nonconductive so that the oscillating signal 106 no longer appears on the output lead 143.

ALTERNATIVE EMBODIMENTS

It is to be understood that other forms of dampeners, both mechanical and electrical, may be used to bring the bonding apparatus to a rest position rapidly after the cessation of the short pulse electrical signal. For example, an eddy current brake could be employed to stop the vibration. In such a device, preferably a ferromagnetic member is mounted on the bonding apparatus for movement in a direction perpendicular to the lines of flux of a magnet positioned adjacent the apparatus. As the ferromagnetic member cuts the flux lines of the magnet, electromotive forces are induced in the member which resist the movement of the bonding apparatus and generate heat in the member. Thus, the eddy current brake generates forces in opposition to the movement of the bonding apparatus so as to oppose the movement of the apparatus and rapidly bring it to a rest position at the cessation of a short pulse electrical signal.

Another dampener which can be employed is an electrical circuit wherein a negative feedback loop is provided for feeding the signal generated by the vibrations of the transducer 23, which continue at the cessation of the short pulse electrical signal, to the input of the power amplifier 105 where they are amplified and fed back to the transducer 23. In such an arrangement, known as an operational amplifier, the amplifier 105 should be an inverting amplifier which generates a signal which is 180° out of phase with the vibrations of the transducer 23 so as to oppose the signal generated by the continuing vibrations of the bonding apparatus. It is possible with such an electrical brake or dampener to effect "critical damping," i.e., to stop the bonding apparatus within one quarter of a cycle after the cessation of the short pulse electrical driving signal.

DETERMINING THE OPTIMUM PULSE TIME RANGE

In FIGS. 17–20 there are shown curves depicting bond strengths as a function of bonding time of a 1% silicon-aluminum wire (1 mil) bonded to a flat gold member. A short pulse signal, such as the signal 109 (FIG. 15), was used. The wire was partially annealed, commonly known as "half hard" or "½ H." The clamping force between the wire and the member was held constant at 50 grams and the frequency of the input electrical signal was constant at 60 kc. The input power to the bonding apparatus (FIG. 5) was varied in increments and was measured by a strain gauge (not shown) consisting of an electrostrictive flexural beam of barium titinate which was mounted on the tip end of the bonding apparatus. Vibration of the apparatus generates a voltage in such a gauge which is a direct function of the magnitude of the vibrations. The vibrations are in turn a direct function of the magnitude of the input power. The input power was adjusted so that the strain gauge indicated values of 8 volts (FIG. 17), 10 volts (FIG. 18), 12 volts (FIG. 19) and 15 volts (FIG. 20), and then at each level of input power the pulse times were varied in increments of 1 millisecond between 1 millisecond and 15 milliseconds.

The resulting bonds were tested for strength and plotted on the vertical axis of the graphs between 0 to 0.5 (no bond), 0.5 to 3.5 (poor bond), 3.5 to 5.0 (normal bond) and 5.0 to 6.0 (optimum bond). It should be noted that the numerical values assigned to bond strength are relative values on an arbitrary scale and do not represent absolute values. The term "optimum bond" (a value in excess of 5.0 on the scale) indicates that the bond is stronger than the 1% silicon-aluminum wire (1 mil) as determined through the use of a standard pull test.

At an 8 volt reading on the strain gauge (FIG. 17), "poor" bonds result at pulse times of 1 to 5 milliseconds. At 6 milliseconds it has been discovered that the strength of the bond rapidly increases to an "optimum" bond, and that "normal" to "optimum" bonds are achieved from 6 to 14 milliseconds. At 15 milliseconds the strength of the bond rapidly decreases to "poor."

At a 10 volt reading on the strain gauge (FIG. 18), "poor" bonds result at pulse times of 1 or 2 miliseconds. At 3 milliseconds it has been discovered that the strength of the bond rapidly increases to an "optimum" bond and that "normal" to "optimum" bonds are achieved from 3 to 11 milliseconds. At 12 milliseconds the strength of the bond rapidly decreases to "poor."

Similar results were discovered at a 12 volt (FIG. 19) and a 15 volt (FIG. 20) reading on the strain gauge. At 12 volts "optimum" bonds are achieved at pulse times from 3 to 8 milliseconds with "poor" or no bonds at shorter or longer pulse times. At 15 volts "optimum" bonds are achieved at pulse times from 2 to 5 milliseconds with "poor" or no bonds at shorter or longer pulse times.

Thus, it has been discovered that there is a critical range of pulse times in which "optimum" bonds are produced by a vibratory bonding apparatus. Of significance is the fact that if the pulse time is increased beyond a determinable period, the bond strength, instead of increasing as might be supposed, actually rapidly decreases. This indicates that there is a critical range of pulse times, which of course varies as other bonding parameters change, wherein "optiumum" bonds are effected.

Stating this another way, it has been discovered that there is a minimum number of acoustical-mechanical movements or excursions through which a particular member which is to be bonded must travel to become joined to another member. The number of excursions is not a constant but instead changes as other parameters, such as clamping force, frequency of vibration, etc., are changed. However, for a certain set of values of these parameters, a satisfactory bond cannot be achieved with fewer than a determinable minimum number of excursions of the bonding apparatus. Likewise, if the number of excursions is greater than a certain limit, the resulting bond will become weakened by the repeated mechanical working and fatigue of the members, the repeated making and breaking of the bond, and the excessive deformation and mash-out resulting from the unnecessary excursions. Therefore, if the bonding system is stopped within a few excursions after the initial bond is effected, minimum mash-out and maximum bond reliability are achieved.

DETERMINING THE OPTIMUM VALUES OF CLAMPING FORCE AND TIP EXCURSION AT A MINIMUM PULSE TIME

Figure 21:
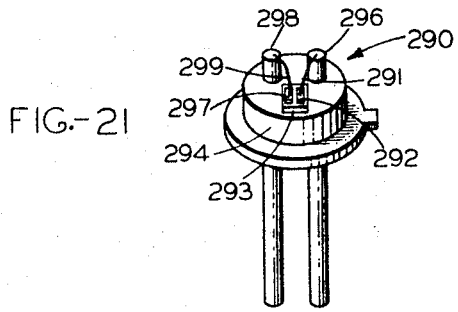
FIG. 21 is a schematic perspective drawing of an electrical component having terminals and stripes between which wires may be bonded by the principles of the instant invention.
Figure 22:
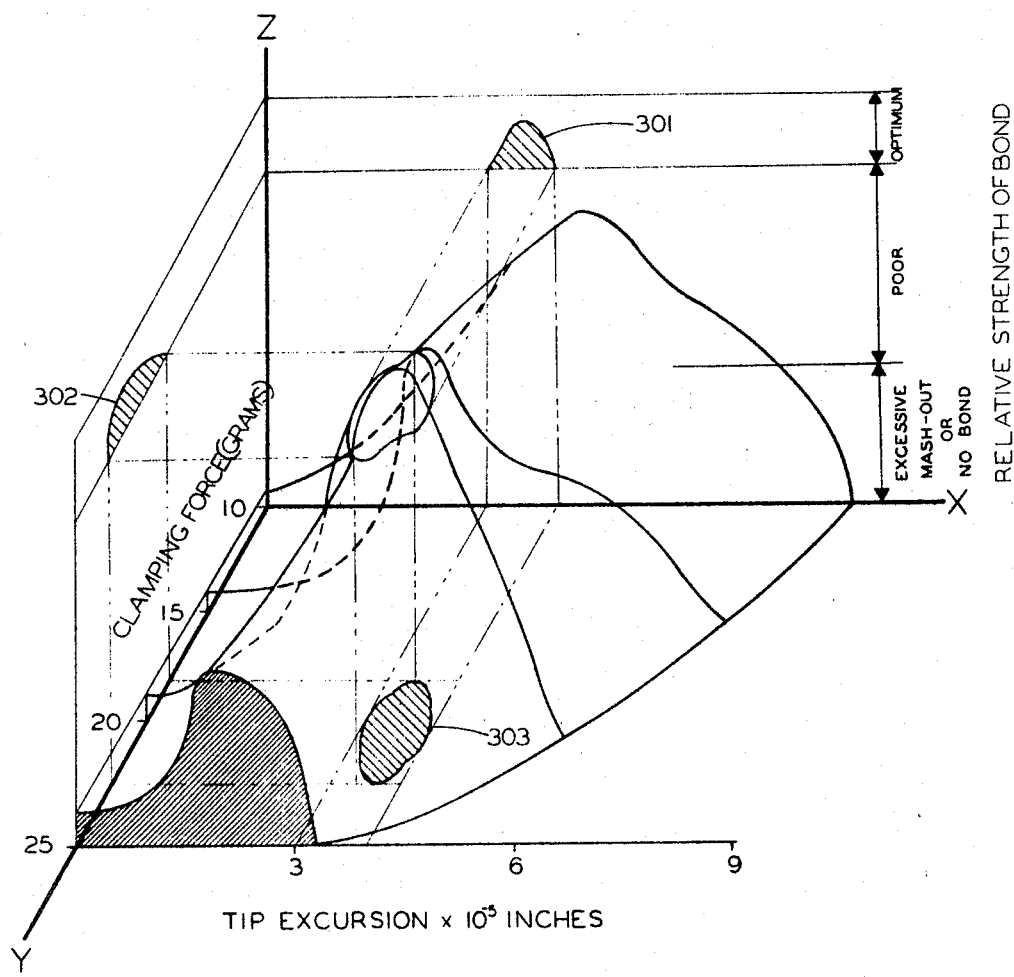
FIG. 22 is a three-dimensional graph showing the bond strength of a one mil gold wire and a gold header as the tip excursion and clamping force are varied in a vibratory bonding apparatus.

In FIG. 21 there is shown a transistor 290 on which it is commonly necessary to bond several wires. In FIG. 22 there is illustrated a three-dimensional graph representing bond strengths which are achieved at various values of tip excursion and clamping force for bonding a 1 mil gold wire 291 to a gold header 294 of the transistor 290. The stripe 292 is mounted on a semiconductor wafer 293, for example of silicon, which in turn is mounted on a header 294. Also, mounted on the header 294 is a terminal or post 296 to which the other end of the wire 291 is bonded. Positioned adjacent to the gold stripe 292 is a vapor plated aluminum stripe 297, and spaced therefrom is a second post 298. A second gold wire 299 is connected between the stripe 297 and the post 298.

In the procedure described above with reference to FIGS. 17–20, the input power and the pulse times were varied. However, because of the many variables in the electronic, acoustical and mechanical portions of the system, it becomes very difficult to specify repeatable bonding parameters, for example power, and it was found that tip excursion is a more repeatable parameter. Holding other bonding parameters at an optimum and investigating wire diameters between one-half mil and one mil, it was discovered that at a pulse time of less than 450 microseconds it is impossible to effect an acoustical bond regardless of the amount of power or clamping force applied. In other words, at less than 450 microseconds it is not possible to effect an acoustical bond even though clamping force and power are maximized. While a thermocompression type of bond can be obtained, the bonded members have excessive mash-out and a low bond strength results. However, at pulse times slightly in excess of this value, for example 450 to 1000 microseconds, a true acoustical and metallurgical bond occurs. By then optimizing the clamping force and tip excursion at a pulse time in that range, it was discovered that the physical and metallurgical characteristics of the bond are greatly improved.

In FIG. 22 the clamping force and tip excursion were varied to bond the 1 mil gold wire 291 (FIG. 21) directly to the gold-plated header 294 (which has surface conditions similar to the stripe 292) while keeping bonding time constant at 650 microseconds and the frequency constant at 60 kc. The header 294 is made of an iron-nickel-cobalt alloy sold under the trademark "Kovar." The resulting bonds were then tested for their strength and were plotted on the vertical axis of the three-dimensional graph in FIG. 22. The values of the strength of the bonds are relative and do not represent absolute values. The term "optimum" again means that the bond was stronger than the 1 mil gold wire 291 as determined through the use of the standard pull test.

It was found that optimum bonds resulted with a clamping force in the range of approximately 18 to 24 grams and a tip excursion of approximately $3 \times 10^{-5}$ inches to $4 \times 10^{-5}$ inches. This set of conditions is depicted as a region 301 projected onto the X–Z axis (bond strength), region 302 projected onto the Y–Z axis (clamping force), and region 303 projected onto the X–Y axis (tip excursion). It is to be noted that all the bonds were accomplished at the very short pulse time of 650 microseconds which is appreciably below that utilized in the prior art. In order to provide such short pulse times an electronic switch such as that shown in FIG. 16 was used.

It should be noted that for a specific pulse time the values of clamping force and tip excursion are not inversely proportional. Thus, if tip excursion is below the required minimum, it is impossible to obtain a true acoustical bond through the addition of more clamping force.

It should be further noted that when dealing with times in the microsecond range, the continuing vibrations of the bonding apparatus at the completion of a pulse be come quite significant. Thus, it is desirable to provide dampeners in accordance with this invention for opposing ringing down as discussed above.

Figure 23:
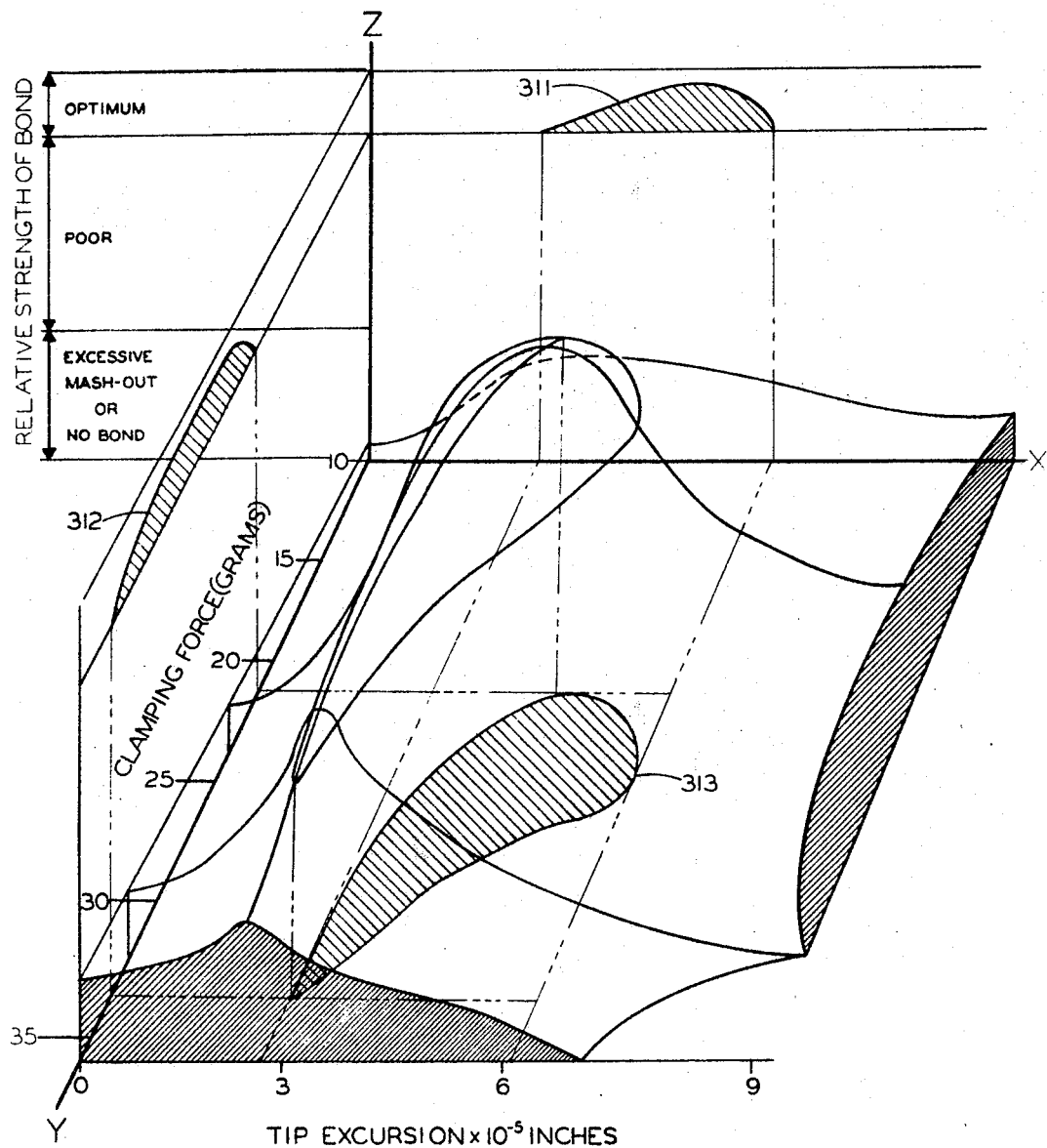
FIG. 23 is a three-dimensional graph showing the bond strength of a one mil gold wire and a gold-plated "Kovar" post under tests similar to FIG. 22.

In FIG. 23 there is shown a second three-dimensional graph similar to that of FIG. 22 for bonding the 1 mil gold wire 291 to the gold-plated "Kovar" post 296. The method of determining a minimum pulse time and then optimizing the clamping force and tip excursion was similar to that described in reference to FIG. 22. It can be seen that although the materials to be bonded remained the same, there was some change in the optimum ranges of clamping force and tip excursion. This is because of the different physical shape of the header 294 and the post 296. As the physical shape changes, the acoustical impedance changes because the support or mandrel (not shown) for the transistor 290 is operating in a different acoustical mode.

Optimum bonds are achieved when the clamping force is held between approximately 21 to 34 grams while maintaining the tip excursion between $3 \times 10^{-5}$ and $6 \times 10^{-5}$ inches. This set of conditions is depicted as a region 311 projected onto the X–Z axis (bond strength), a region 312 projected onto the Y–Z axis (clamping force), and a region 313 projected onto the X–Y axis (tip excursion). It is again pointed out that the pulse time was held constant at 650 microseconds and the input signal to the transducer had a frequency of 60 kc.

Figure 24:
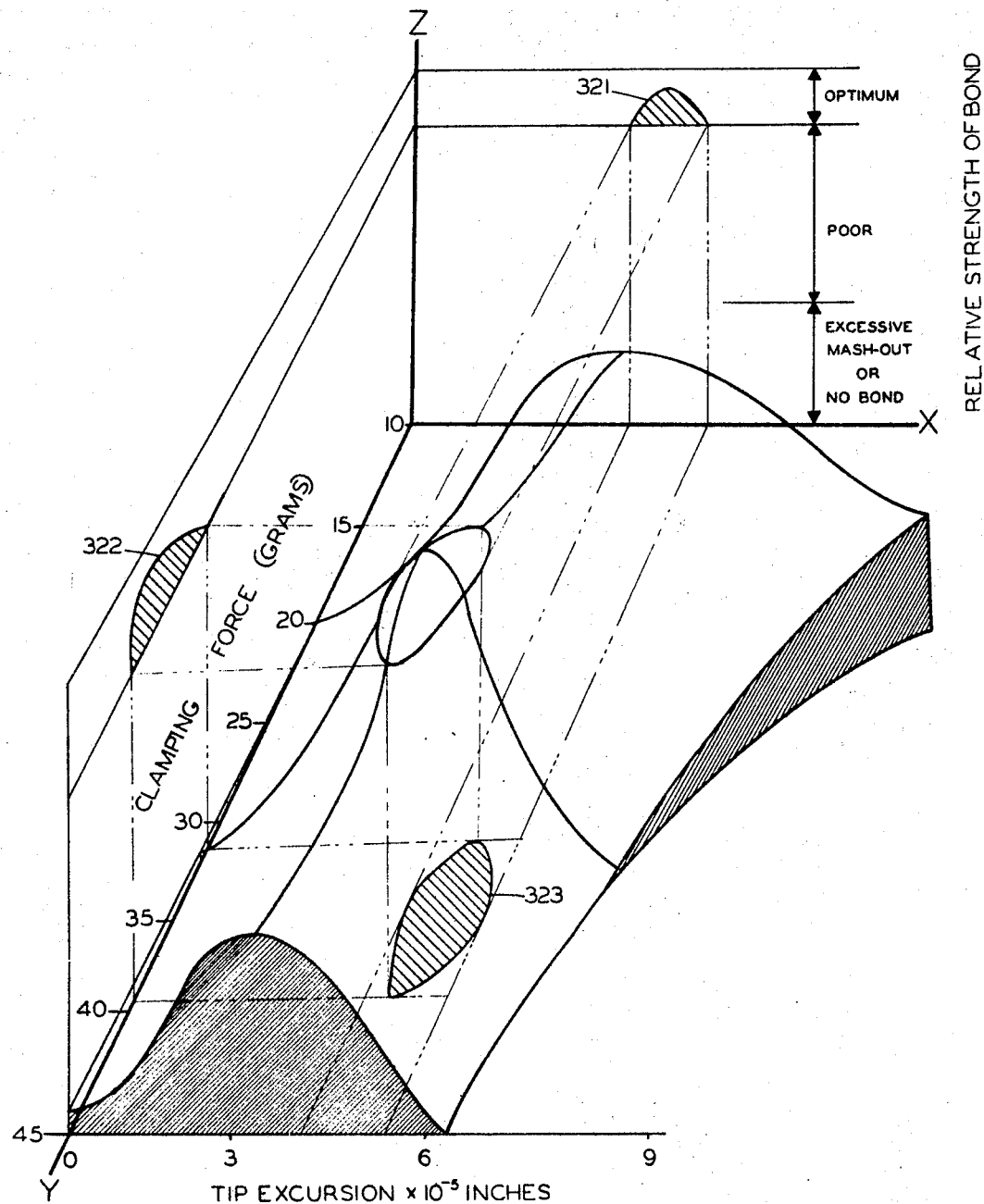
FIG. 24 is a three-dimensional graph showing the bond strength of a one mil gold wire and a vapor-plated aluminum stripe under tests similar to FIGS. 22 and 23.

In FIG. 24 there is shown a third three-dimensional graph similar to that of FIGS. 22 and 23 for bonding the 1 mil gold wire 299 to the vapor plated aluminum stripe 297 which is mounted on the silicon wafer 293. The method of determining a minimum pulse time and then optimizing the clamping force and tip excursion was similar to that described in reference to FIG. 22.

Under these conditions, it can be seen that optimum bonds were achieved by maintaining the clamping force between approximately 30 to 39 grams while the tip excursion was varied between $4 \times 10^{-5}$ to $5 \times 10^{-5}$ inches. This set of conditions is depicted as a region 321 projected onto the X–Z axis (bond strength), a region 322 projected on the Y–Z axis (clamping force), and a region 323 projected onto the X–Y axis (tip excursion).

It should be noted that when optimum clamping force and tip excursion are applied, the pulse time which must be applied is drastically reduced. This is more than merely optimizing the bonding parameters, and involves the discovery that a bond with a predetermined amount of mash-out and high strength is achieved with a determinable minimum number of excursions. Beyond this minimum, the mash-out increases without any further increase in bond strength. Thus, by minimizing the pulse time of the driving cycle, and optimizing the clamping force and magitude of the tip excursions, bonds of superior quality are achieved. This is so even though the structure of the articles to be bonded is varied and the materials, for example gold or aluminum, are different. Even in view of these variables, the optimum set of conditions has overlapping areas as may be seen by reference to FIGS. 22–24. These overlappings of the optimum conditions indicate that the application of the principles of the instant invention is not restricted to the materials and structures set forth in the FIGS. 22–24 and that the principles are applicable to other materials and structures.

It will be appreciated that the above-described arrangements are merely illustrative of the principles of the invention. Numerous other arrangements and modifications may be devised by one skilled in the art without departing from the spirit and scope of the invention.

What is claimed is:

1. Apparatus for vibratory bonding which comprises:
 a bonding tip;
 means for producing short pulses of mechanical vibrations;
 means for coupling the pulses to the bonding tip, the coupling means and bonding tip exhibiting an exponentially decaying vibration at the end of each pulse; and
 means for opposing the exponentially decaying vibration to bring the bonding tip to rest at the end of a pulse.

2. Apparatus as recited in claim 1 wherein the opposing means comprises a resilient member mounted on the coupling means for vibration out of phase with the coupling means.

3. Apparatus as recited in claim 2 wherein the coupling means has nodal and antinodal planes of vibration, and the resilient member is mounted at substantially an antinodal plane of the coupling means.

4. Apparatus as recited in claim 2 wherein the resilient member is generally disc shaped with the plane of the disc perpendicular to the direction of the mechanical vibrations.

5. Apparatus as recited in claim 4 wherein the free radius of the resilient member is equal to substantially one quarter of a wave length of the waves which appear in the shear mode.

6. Apparatus as recited in claim 1 wherein the opposing means is a plurality of resilient members extending radially from the longitudinal axis of the coupling means.

7. Apparatus as recited in claim 6 wherein the coupling means has nodal and antinodal planes, and the resilient members are mounted at substantially antinodal planes on the coupling means.

8. Apparatus for vibratory bonding of minute elements, said apparatus being designed to resonate at a predetermined range of frequencies of operation, said apparatus including a horn, a bonding tip secured to one end of the horn for engagement with one of the minute elements, means for urging the bonding tip against the minute elements to hold the elements in intimate contact, a transducer for converting an electrical signal into mechanical vibrations, means for coupling the transducer to the horn to transmit the mechanical vibrations to the elements to be welded, and a power source for supplying a short pulse electrical signal to the transducer at substantially said range of frequencies of operation, said apparatus exhibiting an exponentially decaying vibration at the end of each short pulse electrical signal, the combination with said apparatus, which comprises:
 means effective on the cessation of the short pulse electrical signal for opposing the exponentially decaying vibration of the apparatus to rapidly bring the apparatus to a rest position.

9. Apparatus for vibratory bonding of minute members together by a short pulse of vibratory energy, said apparatus being designed to resonate at a predetermined range of frequencies of operation and exhibiting an exponentially decaying vibration at the cessation of the short pulse, and said apparatus including a coupler, means for impelling the coupler against one of the members to hold the to-be-bonded faces in intimate contact at the bonding zone and to couple the short pulse of vibratory energy into the intended bonding zone, means for supplying the short pulse of vibratory energy in the predetermined range of frequencies to vibrate the coupler, said short pulse being of sufficient power so that the mechanical vibration delivered by the coupler is at a sufficient energy level to bond the minute members together, the combination with said apparatus, which comprises:

a resilient member extending radially from the longitudinal axis of the coupler and beyond the peripheral surface thereof for flexure during the short pulse in dissonance with the mechanical vibration of the coupler to increase the bandwidth of the range of frequencies of operation, stad resilient member being effective to oppose and rapidly stop the exponentially decaying vibration at the cessation of the short pulse of vibratory energy.

10. A vibratory bonding method for joining minute members, which comprises the steps of:

holding the to-be-bonded areas of the members in contact;

applying a short pulse of vibratory energy to the members to bond them together; and sharply arresting the short pulse at the completion of bonding to prevent breaking of the bond once made.

11. A method of bonding minute elements together by applying a short pulse of vibratory energy thereto, which method comprises the steps of:

holding the to-be-bonded faces of the elements in intimate contact;

applying a short pulse of vibratory energy to the elements by means of a vibrating element to bond the elements together, said vibrating element exhibiting an exponentially decaying vibration at the cessation of each such short pulse; and opposing the exponentially decaying vibration of the vibrating element to rapidly bring it to a rest position at the cessation of each pulse.

12. A method as recited in claim 11 wherein the short pulse has a duration in the range of 450 to 15,000 microseconds.

13. A method as recited in claim 12 wherein the exponentially decaying vibrations are opposed to bring the vibrating element to a rest position within 200 microseconds.

14. A method of determining an optimum range of pulse times for the vibratory bonding of minute members, which method comprises the steps of:

(A) providing a plurality of like pairs of members which are to be bonded together;

(B) applying a force to a pair of the members in a direction and of a magnitude to clamp the contacting to-be-bonded faces of the minute members in intimate contact at the intended bonding zone and to couple mechanical vibratory energy into the zone;

(C) introducing, through a vibrating element contacting one of the to-be-bonded minute members adjacent the bonding zone, mechanical vibration for a first pulse time, said vibration having a frequency and energy level sufficient to bond the members together;

(D) repeating steps A, B, and C and decreasing in increments the pulse time of the mechanical vibration;

(E) testing the strength of the bond at each successive pulse time to determine the pulse time at which the bond strength appreciably increases and optimum bonds are effected;

(F) further decreasing in increments the pulse time and repeating steps A, B, and C to bond successive pairs of like members; and (G) testing the strength of each successive bond to determine the minimum pulse time below the pulse time determined in step E at which the bond strength appreciably decreases and optimum bonds are no longer effected.

15. A method as recited in claim 14 wherein the pulse times determined in steps E and G vary between approximately 450 to 15,000 microseconds.

16. A method of determining an optimum range of pulse times for the vibratory bonding of minute members, which method comprises the steps of:

(A) providing a plurality of like pairs of members which are to be bonded together;

(B) applying a force to a pair of the members in a direction and of a magnitude to clamp the contacting to-be-bonded faces of the minute members in intimate contact at the intended bonding zone and to couple mechanical vibratory energy into the zone;

(C) introducing, through a vibrating element contacting one of the tolbe-bonded minute members adjacent the bonding zone, mechanical vibration for a first pulse time, said vibration having a frequency and energy level sufficient to bond the members together;

(D) repeating steps A, B and C and increasing in increments the pulse time of the mechanical vibration;

(E) testing the strength of the bond at each successive pulse time to determine the minimum pulse time at which the bond strength appreciably increases and optimum bonds are effected;

(F) further increasing in increments the pulse time and repeating steps A, B and C to bond successive pairs of like members; and (G) testing the strength of each successive bond to determine the maximum pulse time above the pulse time determined in step E at which the bond strength appreciably decreases and optimum bonds are no longer effected.

17. A method as recited in claim 16 wherein the first pulse time introduced is approximately 450 microseconds.

18. A vibratory bonding method for joining members, which comprises the steps of:

holding the to-be-bonded areas of the members in contact, applying vibratory energy in a burst of optimum pulse time to the members to bond them together, and sharply arresting the vibratory energy at the cessation of the pulse time to prevent breaking of the bond once made.

19. A method of bonding a minute metal wire to a metal element by a short pulse of vibratory energy to effect a bond having a predetermined optimum strength, which method comprises the steps of:

clamping the to-be-bonded faces of the metal wire and the element together with a force in the approximate range of 18 to 39 grams;

applying a short pulse of vibratory energy to the wire and the element, wherein (A) the pulse time is in the approximate range of 450 to 1,000 microseconds, and (B) the relative vibratory movement of the wire and the element is in the approximate range of $3 \times 10^{-5}$ to $6 \times 10^{-5}$ inches, so that a bond having a predetermined optimum strength is formed.

20. A method as recited in claim 19 in which:

the minute wire and the metal element are gold; and the to-be-bonded faces are clamped together with a force in the approximate range of 18 to 34 grams.

21. A method as recited in claim 19 in which:

the minute wire is gold;

the metal element is aluminum;

the to-be-bonded faces are clamped together with a force in the approximate range of 30 to 39 grams; and the relative vibratory movement of the wire and the element is in the approximate range of $4 \times 10^{-5}$ to $5 \times 10^{-5}$ inches.

22. A method of bonding a minute metal wire to a metal element by a short pulse of vibratory energy to effect a bond having a predetermined optimum strength, which method comprises the stops of:

clamping the to-be-bonded faces of the metal wire and the element together with a force in the approximate range of 18 to 39 grams;

applying a short pulse of vibratory energy to the wire and the element with a vibrating member, said vibrating member exhibiting an exponentially decaying vibration at the cessation of each such short pulse, and said short pulse having a pulse time in the approximate range of 450 to 1,000 microseconds, and providing a relative vibratory movement between the wire and the element in the approximate range of $3 \times 10^{-5}$ to $6 \times 10^{-5}$ inches; and then opposing the exponentially decaying vibration to bring the vibrating member rapidly to a rest position to form a bond having a predetermined optimum strength.

References Cited

UNITED STATES PATENTS

| | | | |
|---|---|---|---|
| 3,056,192 | 10/1962 | Jones | 228—1 |
| 3,153,850 | 10/1964 | Worlton et al. | 29—470 |
| 3,017,792 | 1/1962 | Elmore et al. | 228—1 |
| 3,128,649 | 4/1964 | Avila et al. | 228—1 |
| 3,158,928 | 12/1964 | De Prisco et al. | 29—470 |
| 3,341,935 | 9/1967 | Balamuth | 29—470 |

JOHN F. CAMPBELL, Primary Examiner

R. B. LAZARUS, Assistant Examiner

U.S. Cl. X.R.

29—497; 228—1